Aug. 18, 1931.  H. E. HOLCOMB  1,819,840
METHOD AND APPARATUS FOR MAKING FIBER AND CEMENT SHINGLES AND BOARDS
Filed Jan. 30, 1928  2 Sheets-Sheet 1
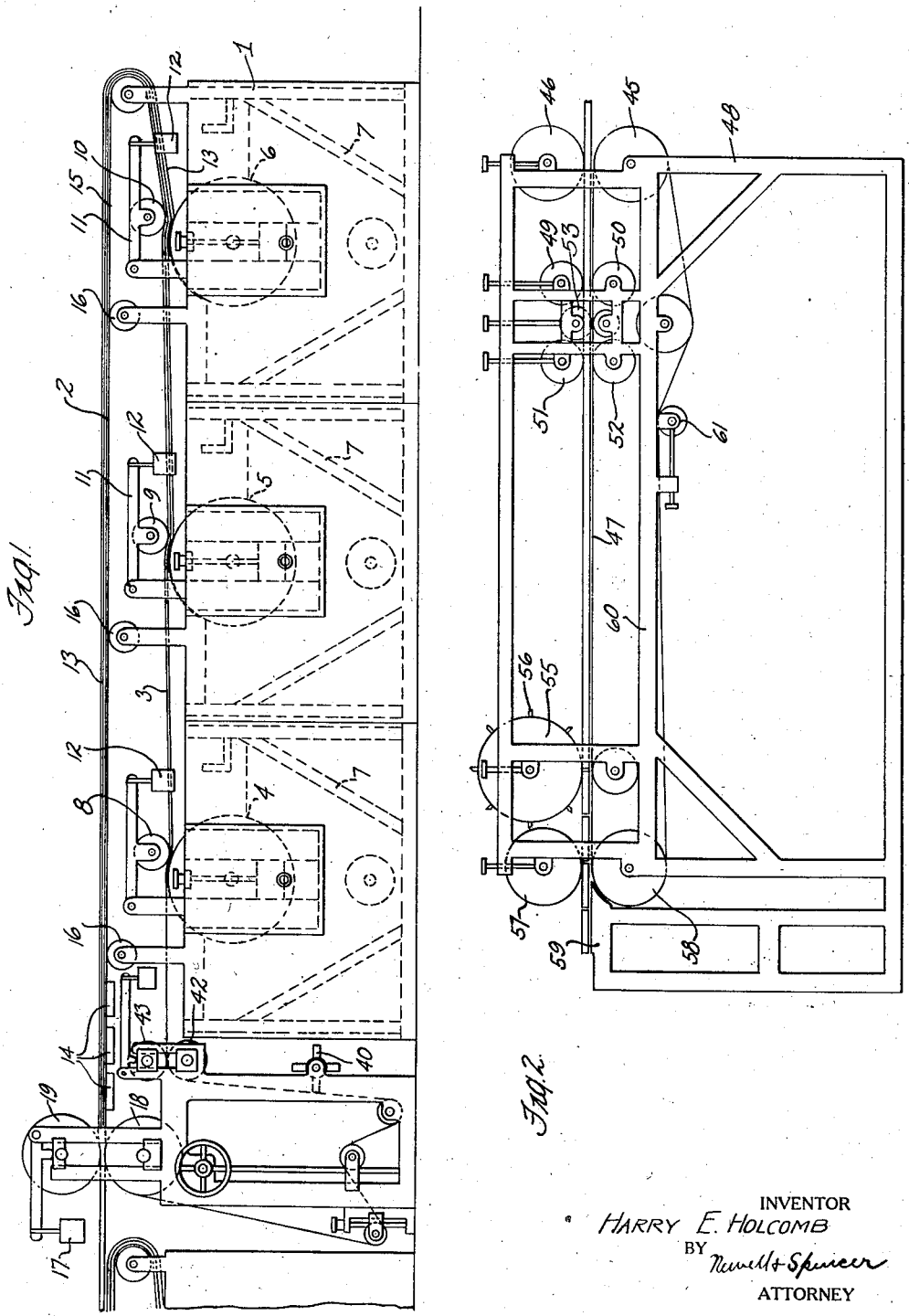
INVENTOR
HARRY E. HOLCOMB
BY
ATTORNEY

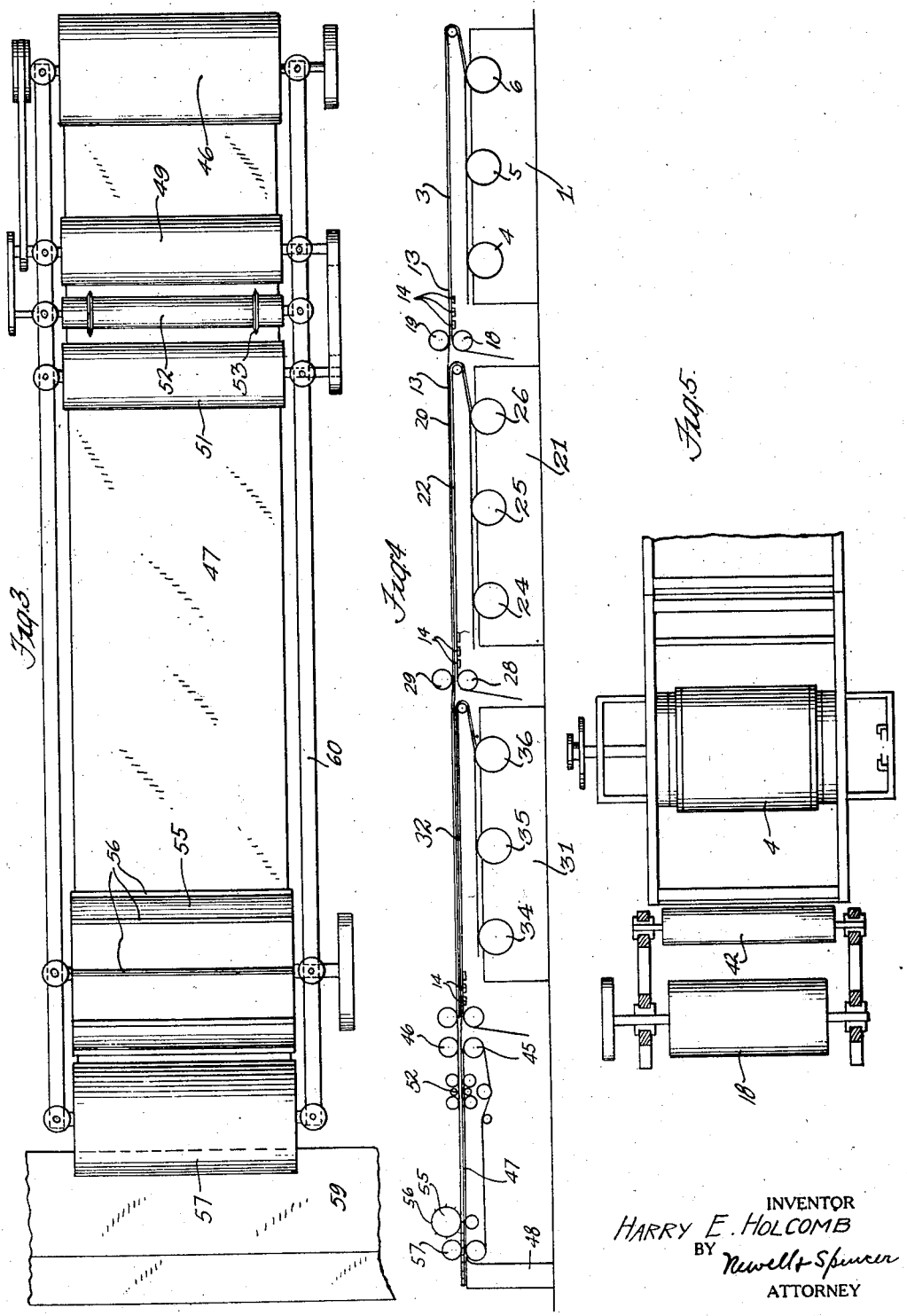

Patented Aug. 18, 1931

1,819,840

UNITED STATES PATENT OFFICE

HARRY E. HOLCOMB, OF BOUND BROOK, NEW JERSEY, ASSIGNOR TO FIBERFRAKS INC., OF NEW YORK, N. Y., A CORPORATION OF NEW YORK

METHOD AND APPARATUS FOR MAKING FIBER AND CEMENT SHINGLES AND BOARDS

Application filed January 30, 1928. Serial No. 250,558.

This invention relates broadly to a method and apparatus for producing composition sheeting, and particularly to a method and apparatus for the production of relatively heavy asbestos board, such as cement shingles and allied products.

The manufacture of composition sheeting, cement slabs or slabs made from cement and asbestos or other fibrous material has been carried out in the past by a process which is in some respects similar to methods of making paper.

In one process of manufacture of cementitious slabs heretofore employed and which involves handling the materials in wet condition, a mixture of cement and asbestos to which water has been added to render it of a consistency of thin paste is applied to a traveling conveyor by means of revolving molds each of which applies a thin sheet of the cement mixture in a plastic state to a felt conveyor to which it adheres. Ordinarily two or sometimes three of these rotatable molds are employed to apply the plastic material to the conveyor until the maximum thickness which will adhere to the underside of the conveyor has been built up. The mixture making up the slab is sometimes applied directly to the upper surface of the conveyor in a layer of predetermined thickness. The plastic material in each case is then carried by the conveyor to a press roll which picks the sheet up from the felt while it is still wet and soft and winds the material in overlapping layers upon the roll until it has reached the desired thickness for the slab or material to be formed. The laminated sheet of material is then slit lengthwise of the roll and removed so that a new series of layers may be applied to the roll. The material cut from the roller is laid out flat and subjected to considerable pressure to compress the laminations and to give the material the proper consistency or density. The sheet of material thus produced is then cut into slabs or shingles and the slabs subjected to further pressure and a drying or curing process.

Such methods of producing cementitious slabs or fiber board are intermittent in operation since the process must be stopped while the material is cut from the press roll upon which it has been formed. Furthermore, in pressing out the material from a circular form to a flat sheet the opposite surfaces of the sheet are subjected to tension and compression by reason of the fact that the outer length of the sheet is longer than the inner length of the sheet. Thus the fibers on one face of a sheet are subjected to tension and those on the other face of the sheet are compressed so that the position of the fibers normal to the face of the shingle will be quite different from their position as laid upon the conveyor and the proportions of fiber and cement in the two faces may be very different.

It is necessary in the processes outlined to handle the sheet of material several times before it is finished so that the material which is still soft and plastic may be considerably distorted before the final product is obtained.

One of the objects of the present invention is to produce a composite or multi-ply sheet of material in which the fibers are in substantially the same position in the finished product as when the sheet was originally formed.

Another object of the invention is to provide a continuous process for making composite sheets of material in which the material is not subjected to appreciable distortion or handling.

A further object of the invention is to provide novel combinations and arrangements of parts by means of which the sheet forming material is laid in overlapping layers and cut into the desired shape without appreciable distortion of the sheet.

One feature of the present invention resides in the use of a plurality of machines for forming layers of plastic material, each of which machines has a conveyor positioned in substantially the same horizontal plane so that a sheet of material may be passed from one machine to the next and into overlapping relation with other sheets of material while being maintained in the same plane.

A further feature of the invention resides in the combination with the sheet-making machines of cutter elements which cut the composite sheet of material into the desired size and shape.

Other features and objects of the invention will appear from the following description and drawings which set forth a preferred embodiment of the invention.

In the drawings—

Figure 1 is a side view of one of the machines used for applying a layer of plastic material to a conveyor;

Figure 2 is a side view of the cutting machine used for cutting the finished sheet of material the desired size and shape;

Figure 3 is a plan view of a portion of the machine shown in Figure 2;

Figure 4 is a diagrammatic view showing a plurality of the machines shown in Figure 1 in combination with the cutting machine shown in Figure 2; and Figure 5 is a plan view of the sheet forming and pressing device shown in Figure 1.

In accordance with the present invention as illustrated in the drawings, a machine 1 is employed for applying the plastic material to a conveyor 2 for forming a layer of the material which may be cement and asbestos or fiber or other material used to make up the composite sheet. The conveyor 2 preferably comprises a lower portion 3 to which the mixture may be applied by each of the rotary molds 4, 5 and 6. These molds are positioned in vats 7 containing the mixture to be applied to the conveyor. The upper portion of the molds engages the lower portion 3 of the conveyor 2 so as to apply a thin layer of the plastic material to the under surface of this portion of the conveyor. Rollers 8, 9 and 10 may engage the upper surface of the portion 3 of the conveyor to hold it in engagement with the molds and for this purpose the rollers 8, 9 and 10 may be carried by pivoted arms 11 to which a weight 12 is applied. Each of the molds 4, 5 and 6 applies a thin layer of the material to the under surface of the conveyor 3, the material applied by mold 5 being laid over that applied by the mold 4 and that applied by the mold 6 being laid over those layers applied by the molds 4 and 5. Any number of the molds 4, 5 and 6 may be employed in order to apply as thick a coat of material 13 to the under surface of the conveyor 3 as will adhere to the conveyor without difficulty.

The conveyor after passing in contact with each of the molds 4, 5 and 6 passes to an upper horizontal run 15, where the layers of material 13 applied to the conveyor are carried on the upper surface. The conveyor may have suitable supports 16 positioned along its length in order to prevent it from sagging and thus distorting the layers of material applied thereto. The conveyor with the layers of material on its upper surface is passed over suction boxes 14 or other suitable devices for withdrawing water from the layers of material 13 carried on the conveyor 2. The material is then passed between the press rollers 18 and 19 by means of which it is compressed. The press roller 19 may be brought into engagement with the conveyor and sheet of material by means of a weight 17 or by any other suitable means. The layers of plastic material after being subjected to pressure by the rollers 18 and 19 are not wound up on the press roller as in previous processes but are passed horizontally onto a similar conveyor 22 carried by a second machine 21 and positioned adjacent to the rollers 18 and 19, as shown in Figure 3 of the drawings. Since the layers 18 have been passed over the suction boxes 14 and between the rollers 18 and 19 they will have a consistency such that they may be passed from one conveyor to another without breaking or distorting and will not be so wet as to adhere to the rollers 18 and 19.

The conveyor 2, after passing between the press rollers 18 and 19, and after the layer of plastic material has been removed therefrom, is preferably passed downwardly and subjected to the action of suitable scrubbers and beaters such as the rotatable member 40 and is then passed back between the rollers 42 and 43 and into contact with the molds 4, 5 and 6. In this way it is possible to produce the layers of the material continuously without interruption and apply the successive layers of material upon one another without interruption of the process.

The pressed layer of material 13 is passed from the conveyor 2 and laid over the newly formed layers of plastic material 20 which have been applied to the conveyor 22 by the molds 24, 25 and 26 which are similar to the molds 4, 5 and 6 of the machine 1. In this way the pressed material 13 is superimposed upon the fresh material 20 and the two are carried in the same horizontal plane to the press rollers 28 and 29 by means of which the two series of layers are subjected to further pressure and passed on to the third machine 31 where the layers 13 and 20 which have both been pressed together are applied to another conveyor 32, the pressed material being superimposed upon newly formed layers of plastic material 30 applied to the conveyor 32 by the molds 34, 35 and 36 as in the machines 1 and 21.

Thus it will be seen that any number of layers of material may be superimposed one upon another by positioning any number of of machines similar to that shown in Figure 1, in alinement with the corresponding portions of the conveyors 2, 22, 32, etc. in the same horizontal plane and moving in the same direction.

The composition of the material in the vats 7 may be varied so that the composition sheeting, cementitious slab, shingle or fiber board or whatever is being produced may comprise any number of layers of material from the various machines 1, 21, 31, etc. and if desired each machine may form a layer of material of a different substance or different mixtures of the same materials. It is also possible for each or any of the molds 4, 5 and 6, 24, 25 and 26, etc. to apply a layer of any desired material to form a part of the composite sheet or slab of material being formed.

After a suitable number of layers of the plastic material has been formed the sheet of material is passed from the conveyor 32 between the rollers 38 and 39 and onto the conveyor 47 of the cutting machine 48 and between the rollers 45 and 46.

The form of cutting machine shown in Figure 4 preferably consists of two sets of pressure rollers 49 and 50, and 51 and 52, between which are located cutting elements 53. In the form shown the cutter 53 trims the edges of the sheet of material so that it will have uniform width and the sheet so trimmed is passed by the conveyor 47 to a second cutter 55 which may be in the form of a cylinder having radially projecting knife edges 56 adapted to cut the sheet of material crosswise of the sheet and thus sever the material into separate pieces such as slabs or shingles. The material so cut is passed between the rollers 57 and 58 onto a plate or conveyor 59 from which they may be removed by a conveyor or other means and subjected to further pressure and a curing process or treated in any other manner desired. The conveyor 47 is returned beneath the table 60 which is supplied with an adjustable tensioning member 61 for taking up any slack in the conveyor.

Sheet material or slabs produced in accordance with the present process are not subjected to any handling or distortion so that the fibers in the finished product are in substantially the same position normal to the face of the sheet of material as when they were originally applied to the conveyor 2 by the molds 4, 5 and 6. In this way it is possible to produce a slab or shingle or a sheet of fiber board or similar material, both surfaces of which are of the same density and have substantially the same proportions of cement and fiber or other material making up the composition as when originally laid upon the conveyor.

In the manufacture of shingles it has been found that very desirable results can be obtained by employing a mixture containing 50% of more by weight of hydraulic cement and animal, vegetable or mineral fiber. A typical example of such a mixture consists of about 5 or 6 parts of Portland cement and 1 part of asbestos fiber. The entire shingle may be made up from this composition or the under layers of the shingle may be made up from some other composition. For example, the under layers of the shingle may consist of 8 or 9 parts of cement and 1 part of some fiber which is cheaper than asbestos, such as rag felt, hair, wood fiber or any other suitable material.

In the manufacture of colored shingles it may be desirable to add some coloring material to either the upper or lower layers of the shingle and this may be effected by adding color to the material in one or more of the vats 7 in the machines 1, 21, or 31. The particular proportions of the materials used will depend upon the nature and character of the product to be produced and it is not intended that the specific proportions given in the above illustrations shall limit the scope of the product produced.

The process itself is continuous and for this reason is capable of large output and may be carried out by utilizing machines in some respects similar to those already used in the art but by positioning and co-ordinating the machines in a novel manner and by carrying out the process continuously as described a better product is produced and the machines made to give a larger output than has been possible heretofore.

While the foregoing invention has been described as carried out in the manufacture of cement and asbestos slabs or shingles it should be clearly understood that the invention is not limited in its application to the manufacture of shingles of this composition or to the manufacture of roofing materials, as numerous other products may be produced by the use of the said apparatus and process set forth. Thus it is possible to produce filled paper, strawboard, asbestos board and similar multi-ply materials in a rapid and simple manner. It should therefore be clearly understood that the method, apparatus or product heretofore described are not to be limited to the specific form, construction or process set forth except as defined in the claims.

In the accompanying claims I have used the word "layer" to include a material in sheet form which is applied to the conveyor by one or more of the molds 4, 5, etc.

What is claimed as new is—

1. The process of producing a sheet of composition material which comprises forming a plurality of layers of hydraulic cement and fiber, passing the layers in a substantially horizontal plane into contact with each other and subjecting said layers to pressure.

2. That step in the method of producing a sheet of composition material which comprises applying a layer of plastic material to a flat conveyor surface, removing the plastic material from said conveyor and laying it upon a second layer of plastic material while maintaining said plastic material in substantially the same plane as that of the conveyor from which it was removed.

3. The process of producing a sheet of composition material which comprises forming a layer of plastic material, supporting said layer on top of the flat portion of a moving conveyor and thereafter substantially without bending it from the same plane, passing the layer into contact with a second layer of material, subjecting the two layers to pressure and cutting the sheet of material so pressed into sheets of the desired size and shape.

4. The method of forming a sheet of material comprising mixing hydraulic cement with asbestos fiber, forming said mixture into thin layers, passing the layers of material in a horizontal plane into contact with other layers of material, subjecting said layers to pressure, and cutting the sheet of material so pressed into sheets of the desired size and shape while the material is still plastic and without material movement of the sheet from the plane in which it is formed.

5. The method of producing a sheet of composition material comprising mixing hydraulic cement with animal, vegetable or mineral fiber, forming said mixture into a thin layer, passing the layer of material in a horizontal plane into contact with another layer of material, subjecting said layers to pressure, and cutting the sheet of material so pressed into sheets of the desired size and shape while the material is still plastic without material movement of the sheet from the plane in which it is formed.

6. The method of producing cementitious slabs which comprises passing a plurality of layers of a hydraulic cement and fiber in a single horizontal plane into overlapping relation, subjecting said layers to pressure to produce a composite sheet, cutting said sheet into the desired slab shapes while still plastic, and while traveling in the same plane, and subjecting the slabs after being cut to further pressure and a curing process.

7. The process of producing a sheet of composition material which comprises forming a layer of plastic material, subjecting the layer to treatment to reduce without completely destroying its plasticity, and thereafter without substantially distorting the layer from its flat condition passing the layer into contact with a second layer of material and subjecting the two layers to a treatment including pressure adapted to unite said layers and to convert them into a coherent sheet.

8. The process of producing a sheet of composition material which comprises forming a layer of wet plastic material, withdrawing a portion of the liquid content from the plastic material and thereafter without substantially distorting the layer from its flat condition passing the layer into contact with a second layer of material and subjecting the two layers to pressure.

9. A method of forming cementitious slabs which comprises forming a mixture of approximately 50% or more by weight of hydraulic cement with animal, vegetable or mineral fibers, adding sufficient water to the mixture to render the material plastic, placing a plurality of layers of said mixture upon one another in a single plane and cutting slabs from the resulting sheet of material.

10. A machine for manufacturing composition sheeting comprising a plurality of conveyors, a plurality of elements for applying plastic material to each of said conveyors in the form of a layer, said conveyors being positioned so that the layer formed on one of said conveyors may be transferred without distortion to a second one of said conveyors in contact with the layer formed on said second conveyor, and means for cutting said material to the desired shape after it has been removed from the conveyor upon which it is formed.

11. A machine for manufacturing composition sheeting comprising a plurality of conveyors, means for applying material to each of said conveyors in the form of a relatively thin layer, a roller for subjecting the material on one of said conveyors to pressure, said conveyors being positioned so that the layer of material formed on one of said conveyors after being subjected to pressure may be passed into contact with a layer of material which has not been subjected to pressure formed on another of said conveyors without appreciable distortion, and means for subjecting the superimposed layers of material to pressure.

12. A machine for manufacturing composition sheeting comprising a plurality of conveyors positioned in alinement and moving in the same direction in the same plane so that material carried by one conveyor may be laid upon the material carried by a succeeding conveyor without handling or distorting the material, means for applying material to a plurality of said conveyors in the form of layers, and means for subjecting the superimposed layers of material to pressure.

13. A machine for manufacturing composition sheeting comprising a plurality of conveyors positioned in alinement and moving in the same direction in the same plane so that material carried by one conveyor may be laid upon the material carried by a succeeding conveyor without handling or distorting the material, means for applying material to a plurality of said conveyors in the form of layers, means for subjecting the superimposed layers of material to pressure, and a rotary cutter engaging said material after it has been subjected to pressure to cut the said material to the desired shape.

14. The process of producing a built up sheet from plastic material which comprises forming a sheet by applying a thin layer of the material onto a substantially flat moving surface of a conveyor, forming a second sheet in a similar manner on another conveyor, combining on the upper surface of a substantially flat conveyor the two sheets thus formed, and pressing the two together.

15. The process of producing a built up sheet of fibrous composition which comprises depositing a wet layer of fibrous material from a body of pulp onto a surface of a conveyor, transferring said layer onto the top of a substantially flat portion of another conveyor, and uniting it thereon with another wet layer of fibrous material.

16. The method of forming a thick sheet of fibrous material which comprises depositing a layer of fibrous material from a body of pulp onto a rotating mold, transferring the layer thus formed to the under side of a moving conveyor, inverting the conveyor so that it forms a substantially flat surface with the layer of fibrous material supported on the top thereof, uniting this layer with other layers of fibrous material while in substantially the same plane, and treating said layers to form a dry coherent sheet without substantially deforming it from its flat condition.

17. A machine for manufacturing composition sheets which comprises a plurality of cylinder molds, a plurality of conveyor belts, each adapted to take wet layers of material from the cylinder molds, means associated with each conveyor for pressing it against a cylinder mold, means associated with each conveyor for supporting a portion thereof on which the wet layer is carried in a plane that is substantially the same as that of similar portions of the other conveyors, and means for transferring a layer of material from one conveyor onto the layer of material on another conveyor without substantial distortion from the plane in which it had been supported.

18. The method of forming composite sheets substantially free from objectionable stresses which comprises building up a relatively thick sheet on a conveyor by combining thereon a plurality of relatively thin layers of pulp, similarly building up upon another conveyor a relatively thick sheet and combining these sheets while still in a loosely cohering condition, and while maintained substantially in the form desired for the finished sheets, and thereafter, without substantially disrupting by bending said form, converting the resulting sheet into a strong coherent board, and cutting it to size.

Signed at New York, N. Y. this 13th day of January, 1928.

HARRY E. HOLCOMB.